May 7, 1957  E. E. KRUBSACK  2,791,250
MOBILE DEBARKER FOR PULPWOOD
Filed Feb. 8, 1956  2 Sheets-Sheet 1

Eugene E. Krubsack
INVENTOR.

BY *Clarence A. O'Brien*
and *Harvey B. Jacobson*
Attorneys

May 7, 1957  E. E. KRUBSACK  2,791,250
MOBILE DEBARKER FOR PULPWOOD
Filed Feb. 8, 1956  2 Sheets-Sheet 2
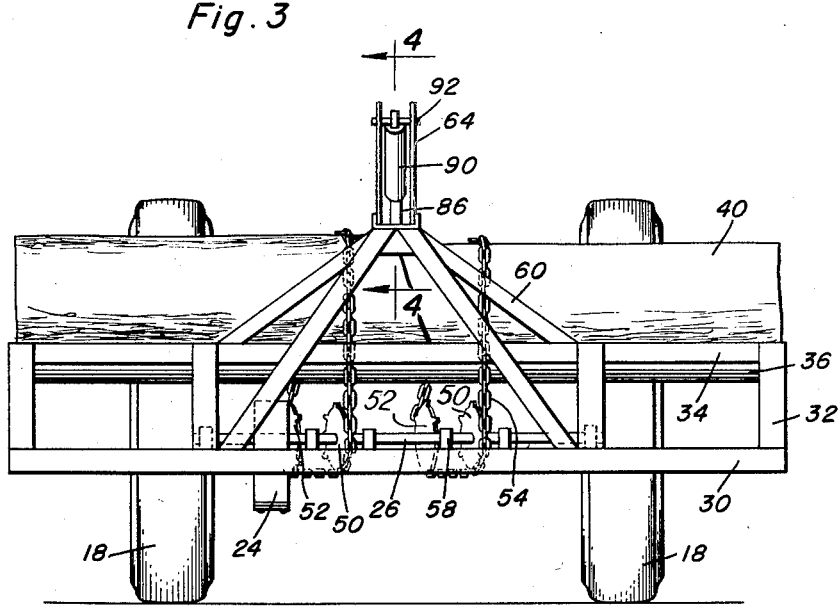
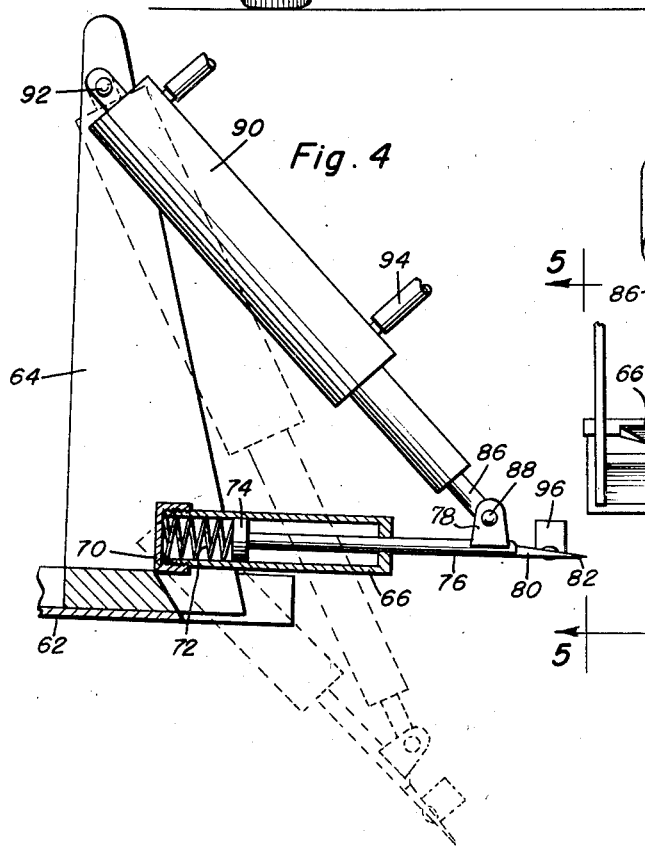
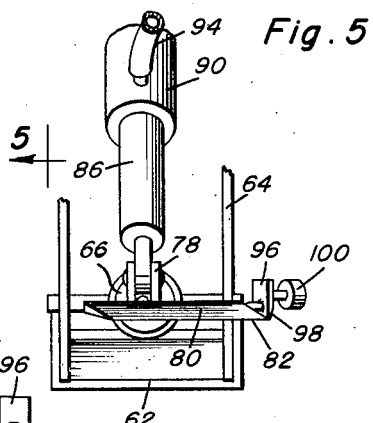
Eugene E. Krubsack
INVENTOR.

United States Patent Office 2,791,250
Patented May 7, 1957

2,791,250

MOBILE DEBARKER FOR PULPWOOD

Eugene E. Krubsack, Plover, Wis.

Application February 8, 1956, Serial No. 564,286

2 Claims. (Cl. 144—208)

This invention generally relates to a device for removing bark from pulpwood to facilitate the processing of the pulpwood.

The primary object of the present invention is to provide a pulpwood-debarking device which is generally portable in nature and which is adapted to be transported directly into a forest for location adjacent the area in which the trees or timber is being felled, thereby eliminating the expense of bringing the felled timber to a permanent location.

Another object of the present invention is to provide a debarker provided with a cutting head together with means for supporting and rotating a piece of timber against the cutting head for removal of the bark wherein the bark will be deposited in the forest thereby eliminating the necessity for disposal thereof and also eliminating the necessity for transporting the extra weight created by the bark.

Other objects of the present invention will reside in its simplicity of construction, ease of operation, ease of movement from one position to another, adaptation for its particular purposes and its relatively inexpensive manufacturing and maintenance cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a rear view of the log debarker;

Figure 4 is a detailed sectional view taken substantially upon a plane passing along section line 4—4 of Figure 3 illustrating the structural details of the debarking spud; and Figure 5 is a detailed view taken along reference line 5—5 of Figure 4 illustrating the arrangement of the blades for peeling bark from pulpwood.

Figure 1:
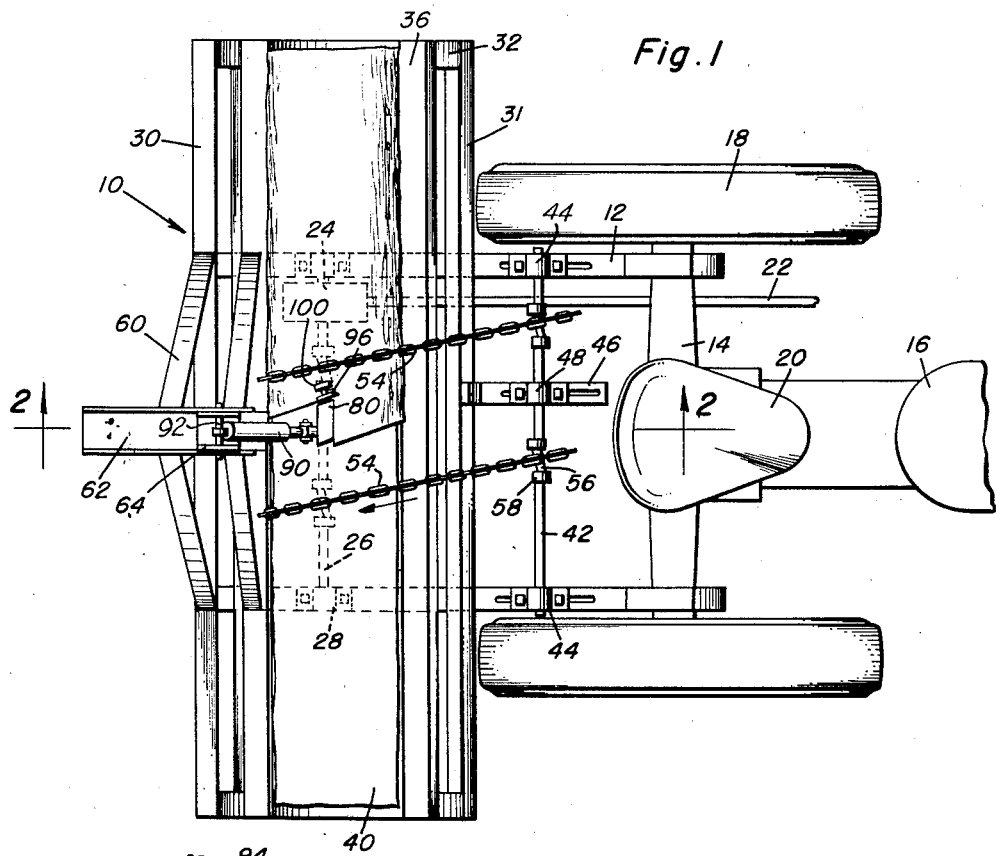
Figure 1 is a top plan view of the debarker of the present invention illustrating the device attached to the rear of a tractor.

Referring now specifically to the drawings, the numeral 10 generally designates the pulpwood debarker of the present invention which is attached to rearwardly extending supporting brackets 12 attached to a rear axle housing 14 of a tractor 16 having conventional rear driving wheels 18, seat 20 and power take-off shaft 22, the latter extending rearwardly of the wheels and into a gear transfer box 24 for rotating a drive shaft 26 supported on bearings 28 on the brackets 12.

Interconnecting the rearwardly extending longitudinal brackets 12 are transverse members 30 and 31 having upwardly converging brace members 32 connected to upper rail members 34. The upper rail members 34 are interconnected by a trough member 36 having a concave upper surface 38 for receiving and positioning a log 40 transversely and in the rear of the tractor 16, the trough 36 supporting the log 40 for rotation.

Disposed forwardly of the forwardmost lower rail 31 is an idler shaft 42 supported on end bearings 44 which are adjustably attached to slotted portions of the brackets 12. A central slotted bracket 46 is provided for adjustably supporting a central bearing 48, the brackets 44, 48 being adjustable toward and from the drive shaft 26 for a purpose described hereinafter.

Disposed on the drive shaft 26 is a pair of drive sprockets 50 and disposed on the idler shaft 42 is a pair of idler sprockets 52 in alignment with the sprockets 50. An endless chain 54 engages each aligned pair of the sprockets 50, 52 and is trained over the log whereby each endless chain 54 encircles its pair of aligned sprockets 50 and 52 and the log 40. The log 40 will be caused to rotate counterclockwise as viewed in Figure 2 when the chains 54 are driven by the drive sprockets 52 in the direction indicated by the arrows in Figures 1 and 2. It is pointed out that the chains 54, the drive sprockets 52 and the idler sprockets 50 are disposed in inclined relation to the longitudinal axis of the log 40 in order to impart simultaneous axial and rotational movement to the log 40 along the trough 36.

Figure 2:
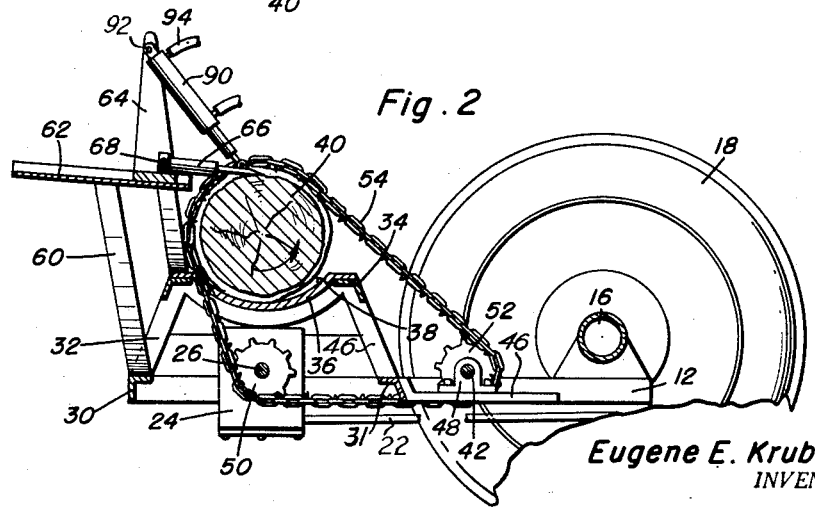
Figure 2 is a longitudinal, vertical sectional view taken substantially upon a plane passing along section line 2—2 of Figure 1 illustrating the details of construction of the log debarker.

Each of these sprockets 50 and 52 is mounted on a stub shaft 56 which is connected to the respective shafts 26 and 42 by universal couplings 58 which permit rotational movement of each pair of aligned sprockets 50, 52 in coplanar paths which contain a plane that intersects the shafts 26 and 42 at acute angles on the log-infeed side of said plane, as viewed in Figure 2. The bearings 44, 48 may be moved longitudinally along their slotted supports to permit the chains 54 to encircle logs of varying diameters and yet be retained in taut condition.

Extending upwardly from the rear transverse rails 30 and 34 are upwardly converging brace members 60 terminating in a channel-shaped member 62 which is downwardly inclined and provided with a pair of upstanding bracket members 64 having a cylinder 66 hingedly attached thereto by coaxial pivot pins 68. The cylinder 66 is provided with a removable closure 70 on one end thereof and a compressible spring 72 is disposed therein so that a piston 74 when sliding rearwardly in the cylinder 66 will be cushioned by the resiliency of the spring 72. A piston rod 76 extends from the piston 74 outwardly through the other end of the cylinder 66 and has a pair of upstanding lugs 78 adjacent the outer end thereof and a blade 80 extending horizontally therefrom, an outer edge 82 of the blade 80 being sharpened for engaging the peripheral surface of the log 40. For varying the angular position of the blade 80, a hydraulically operated piston and cylinder arrangement is provided, a piston rod 86 being hingedly attached to the lug 78 by a hinge pin 88 and a cylinder 90 being hingedly attached between the upper ends of the bracket member 64 by a hinge pin 92. Suitable fluid-pressure conduits 94 are provided for connection to the hydraulic system of the tractor 16 wherein the angular position of the piston rod 76 and the position of the blade 80 may be varied so that logs of varying sizes may be debarked by swinging the piston rod 76 about the horizontal axis of the pins 68.

Integrally formed with the leading edge of the blade 80 is an upstanding blade 96 having the lower end thereof sharpened as indicated by the numeral 98 and a roller 100 is provided on and beside the upstanding blade 96 for engaging the rough bark surface of the log for providing a guide for the blades 98 and 80. The length of the blade 80 is at least equal to the longitudinal distance moved with each revolution of the log 40 thereby assuring a continuity of the debarking operation. The vertical blade 96 cuts into the bark ahead of the blade 80 in order to obtain a clean cut and thus prevent any jamming of the blade 80 which might be caused if the blade had to continuously pull the peeled strip of bark from that portion that still adheres to the log.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A pulpwood debarker comprising a mobile frame, means on said frame rotatably supporting a log, means for rotating a log and moving the same longitudinally, and cutting means engaging the periphery of a log for removing bark therefrom as such log is rotated and moved longitudinally, said log-supporting means including an elongated trough member having a concave surface for positioning a log, said log-rotating means including a pair of endless chains, sprockets rotatably supported on said frame, the chains engaging and encircling a log and said sprockets, means for driving one of said sprockets, each of said chains moving in a path which contains a plane that intersects the longitudinal axis of a log at an acute angle whereby such log will be moved longitudinally as it is rotated by the chains, said bark-removing cutting means including a pivotally supported bracket, a blade movably mounted on said bracket, resilient means urging said blade into contact with a log, said blade being at least equal in length to the longitudinal movement of such log during each revolution thereof, and means for swinging the blade in a vertical path to accommodate logs of different diameters.

2. The combination of claim 1 wherein said blade is provided with a vertical blade at a leading edge thereof for forming a spiral cut in such bark before its removal by the first-mentioned blade whereby to eliminate tearing of such bark, and wherein said cutting means is provided with a depth-gauge roller to prevent gouging of a log.

References Cited in the file of this patent

UNITED STATES PATENTS

| | | |
|---|---|---|
| 397,114 | Dolsen | Feb. 5, 1889 |
| 2,259,584 | Prentice | Oct. 21, 1941 |
| 2,581,617 | Alfsen | Jan. 8, 1952 |
| 2,681,670 | Prentice | June 22, 1954 |
| 2,718,910 | St. Clair | Sept. 27, 1955 |

FOREIGN PATENTS

| | | |
|---|---|---|
| 141,296 | Sweden | July 21, 1953 |